United States Patent
Ciampolini

(10) Patent No.: US 8,410,754 B2
(45) Date of Patent: Apr. 2, 2013

(54) MANAGEMENT UNIT AND METHOD FOR MANAGING ELECTRIC ENERGY STORED IN A BATTERY COMPRISING A NUMBER OF SERIES-CONNECTED CELLS

(75) Inventor: Franco Ciampolini, Bologna (IT)

(73) Assignee: Magneti Marelli S.p.A. (IT)

( * ) Notice: Subject to any disclaimer, the term of this patent is extended or adjusted under 35 U.S.C. 154(b) by 260 days.

(21) Appl. No.: 13/033,172

(22) Filed: Feb. 23, 2011

(65) Prior Publication Data
US 2011/0309797 A1    Dec. 22, 2011

(30) Foreign Application Priority Data
Feb. 24, 2010  (IT) .................................. BO10A0102

(51) Int. Cl.
*H02J 7/00*          (2006.01)

(52) U.S. Cl. ......... 320/116; 320/118; 320/119; 320/122

(58) Field of Classification Search .................. 320/116
See application file for complete search history.

(56) References Cited

U.S. PATENT DOCUMENTS
2005/0122746 A1   6/2005  Nagel et al.
2009/0237030 A1   9/2009  Oh et al.

FOREIGN PATENT DOCUMENTS
| FR | 2408241 A1 | 6/1979 |
| WO | WO-03092148 A1 | 11/2003 |
| WO | WO-2007145463 A1 | 12/2007 |

OTHER PUBLICATIONS
Italian Search Report dated Oct. 26, 2010.

*Primary Examiner* — Edward Tso
*Assistant Examiner* — Ahmed Omar
(74) *Attorney, Agent, or Firm* — Bliss McGlynn, P.C.

(57) ABSTRACT

A management unit and method for managing electric energy stored in a battery composed of a number of series-connected cells, the management unit having: a main equalizing circuit, which forms the primary of an electric transformer and has a constant alternating-current generator powered by the battery and which feeds alternating current of constant intensity through the main equalizing circuit; and, for each cell of the battery, a secondary equalizing circuit, which forms the secondary of the electric transformer, is connected parallel to the cell, has a one-way electronic device which imposes electric current flow to the cell in one direction only, and is connected to a drive device that can be activated to zero the voltage applied to the cell by the secondary equalizing circuit.

11 Claims, 3 Drawing Sheets

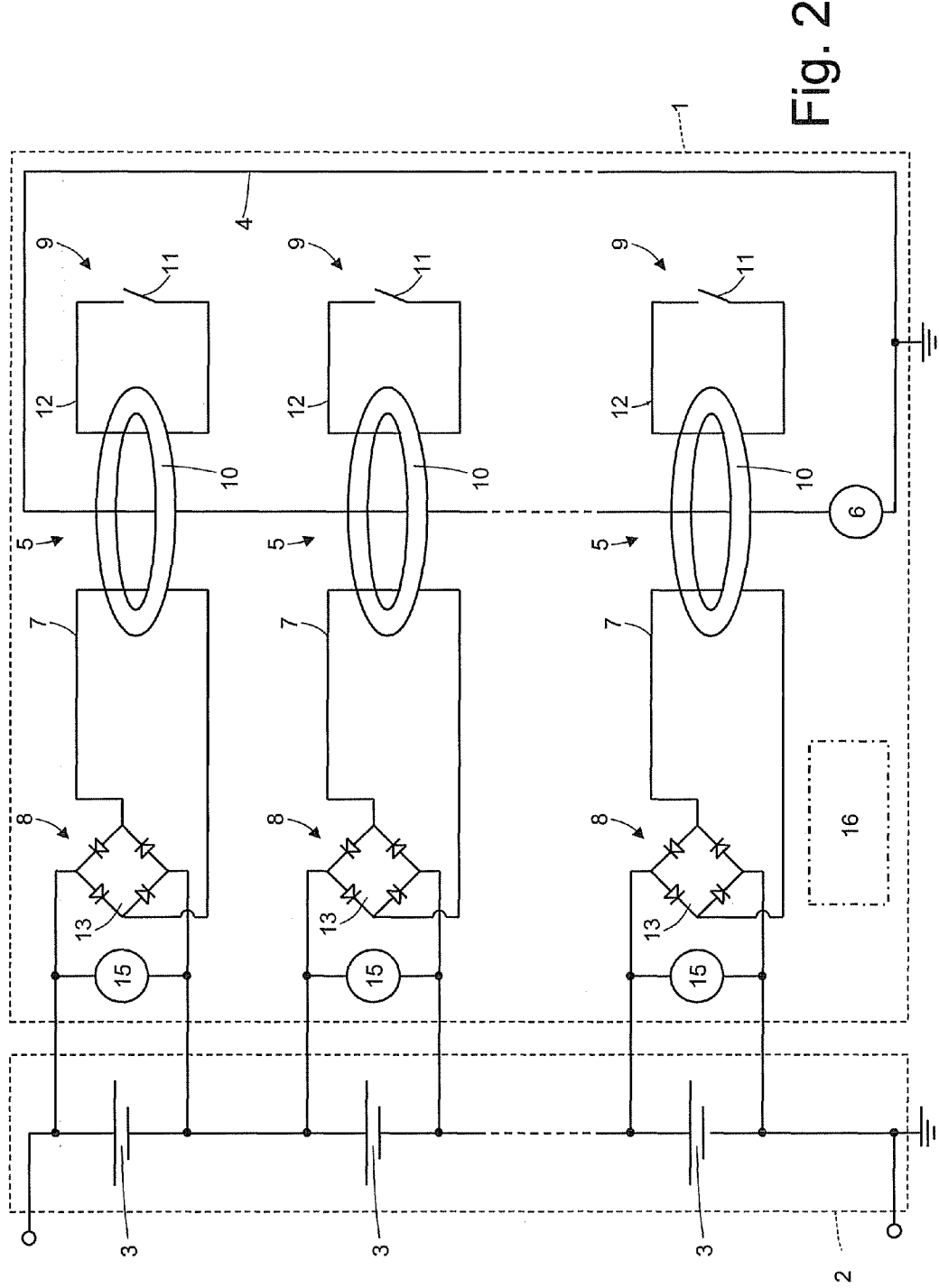

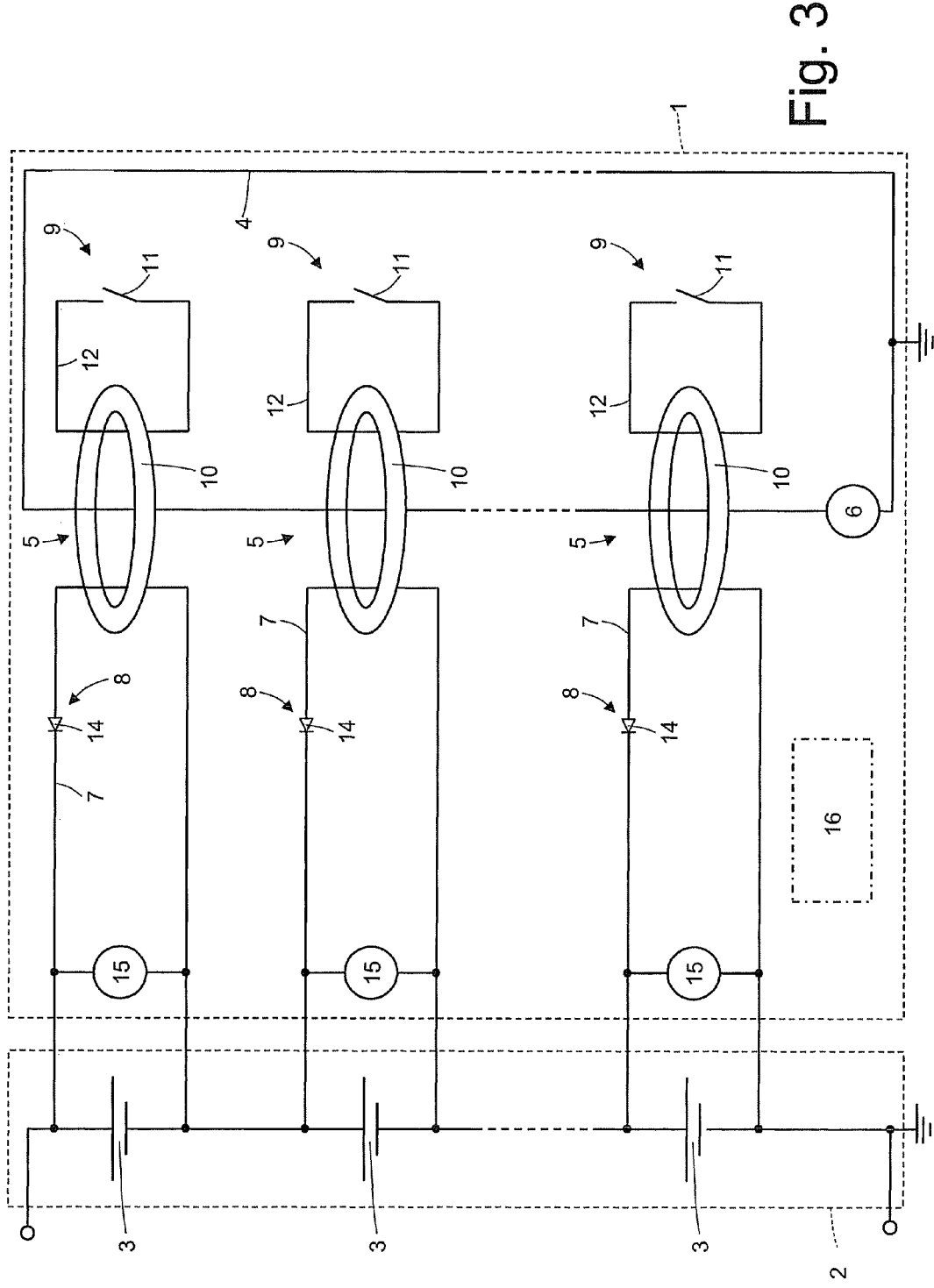

MANAGEMENT UNIT AND METHOD FOR MANAGING ELECTRIC ENERGY STORED IN A BATTERY COMPRISING A NUMBER OF SERIES-CONNECTED CELLS

CROSS-REFERENCE TO RELATED APPLICATION

This application claims priority under 35. U.S.C. §119 to Italian Patent Application No. BO2010A-000102, filed on Feb. 24, 2010 with the Italian Patent and Trademark Office, the disclosure of which is incorporated herein in its entirety by reference.

TECHNICAL FIELD

The present invention relates to a management unit and method for managing electric energy stored in a battery comprising a number of series-connected cells.

The present invention is particularly advantageous for use in a hybrid-vehicle drive battery, to which the following description refers purely by way of example.

BACKGROUND ART

An automotive drive battery (or, rather, 'battery pack') comprises a number of electrochemical cells, which are used to convert accumulated chemical energy into electric energy, and are series-connected to sum the voltage of the individual cells. In other words, series-connecting the cells to the battery terminals produces a high enough voltage for the battery to supply considerable electric power, while still maintaining acceptable electric current intensity. For example, a typical hybrid-vehicle drive battery has a rated voltage of 400 volts at its terminals, and comprises a hundred series-connected cells, each with a rated voltage of 4 volts.

Because of inevitable differences in the manufacturing tolerances and dispersion of the battery cell component parts, the capacity of the cells (i.e. the amount of electric charge that can be supplied, and normally expressed in ampere-hours) differs significantly—by roughly ±10 percent of the rated value in currently marketed batteries. And because the cells are series-connected, the capacity of the battery (i.e. of the series-connected cells as a whole) is limited to the lowest capacity (i.e. to the capacity of the cell with the lowest capacity). In other words, only the least-performing cell is used to the full. In currently marketed batteries comprising a hundred series-connected cells, this means only one is used to the full, and the other ninety-nine are more or less underexploited.

To exploit all the cells to the full, electric energy management (or so-called equalizing) units have been proposed to transfer electric energy between the cells during operation of the battery. For example, as the battery discharges, the electric energy management unit transfers electric energy from the better-performing (i.e. higher-capacity) cells to the lesser-performing (i.e. lower-capacity) cells, so that all the cells are exploited to the full.

Currently marketed electric energy management (or equalizing) units, however, are complicated, bulky, and expensive, and not particularly efficient energy-wise.

WO2007145463A1 describes a management unit for managing electric energy stored in a battery comprising a number of series-connected cells, and which comprises: a main equalizing circuit, which forms the primary of an electric transformer and has an alternating-current electric generator; and, for each battery cell, a secondary equalizing circuit, which forms the secondary of the electric transformer, and is therefore coupled magnetically to the main equalizing circuit, is connected parallel to the cell, has a one-way electronic device which imposes electric current flow to the cell in one direction only, and is connected to a drive device that can be activated to zero the voltage applied to the cell by the secondary equalizing circuit. The electric generator supplying the main equalizing circuit uses the battery voltage, and comprises a CSW redistribution transistor, which is opened or closed to enable or disable energy transmission from the higher- to lower-charged cells.

DESCRIPTION OF THE INVENTION

It is an object of the present invention to provide a management unit and method, for managing electric energy stored in a battery comprising a number of series-connected cells, designed to eliminate the above drawbacks and which, in particular, are cheap and easy to implement.

According to the present invention, there are provided a management unit and method, for managing electric energy stored in a battery comprising a number of series-connected cells, as claimed in the accompanying Claims.

BRIEF DESCRIPTION OF THE DRAWINGS

A number of non-limiting embodiments of the present invention will be described by way of example with reference to the accompanying drawings, in which:

FIGS. 2 and 3 show schematics of two alternative embodiments of the FIG. 1 electric energy management unit.

PREFERRED EMBODIMENTS OF THE INVENTION

Figure 1:
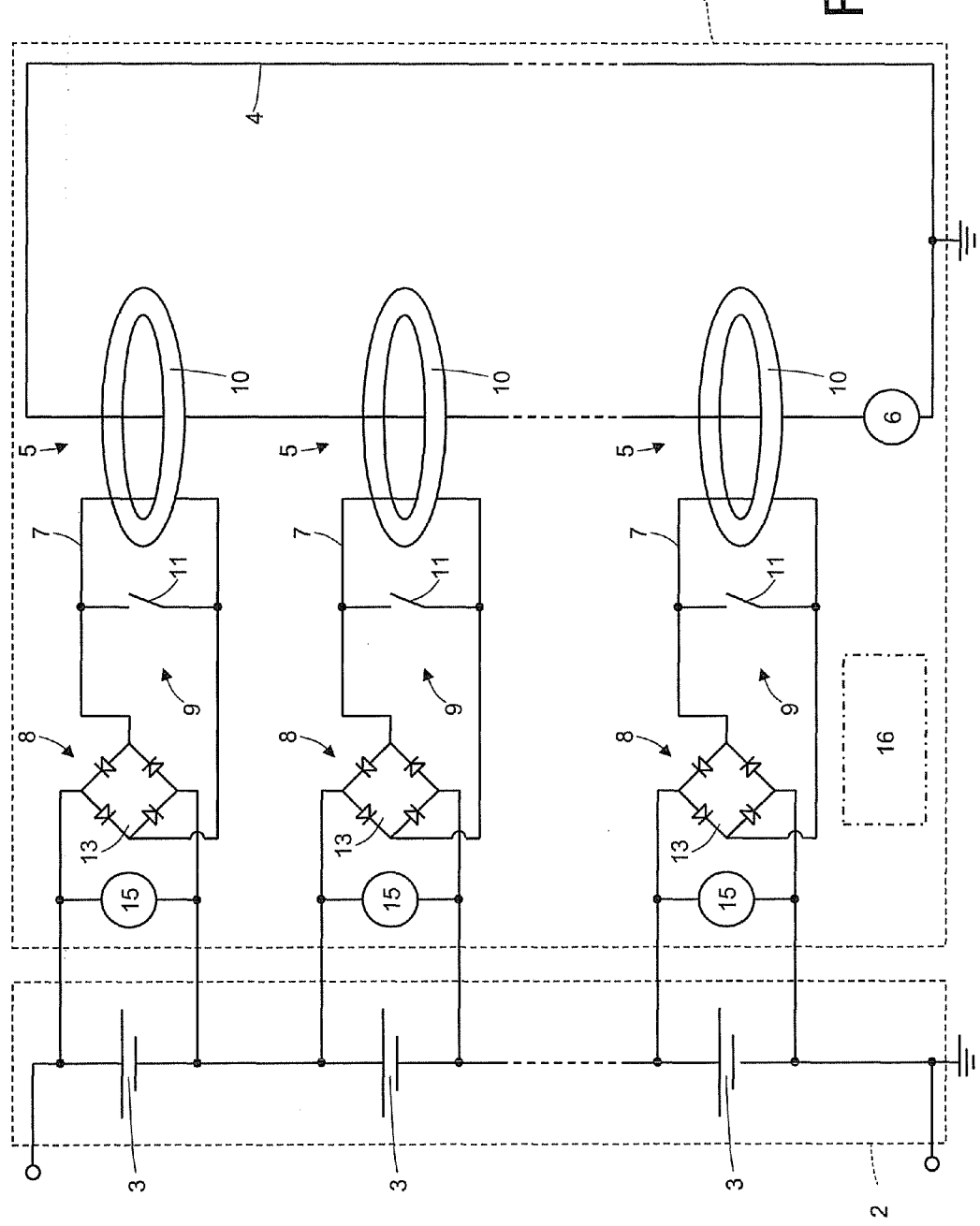
FIG. 1 shows a schematic of a management unit, for managing electric energy stored in a battery comprising a number of series-connected cells, in accordance with the present invention.

Number 1 in FIG. 1 indicates as a whole a management (or equalizing) unit for managing electric energy stored in a battery 2 comprising a number of series-connected cells 3 (only a few of which are shown in FIG. 1).

Management unit 1 comprises a main equalizing circuit 4, which forms the primary of an electric transformer 5 and has a constant alternating-current generator 6 powered by battery 2 and which feeds alternating current of constant intensity through main equalizing circuit 4.

For each cell 3 of battery 2, management unit 1 comprises a secondary equalizing circuit 7, which forms the secondary of electric transformer 5 and is therefore coupled magnetically to main equalizing circuit 4. Each secondary equalizing circuit 7 is connected parallel to cell 3, i.e. the two terminals of secondary equalizing circuit 7 are connected to the two terminals of corresponding cell 3, and has a one-way electronic device 8 which imposes electric current flow to cell 3 in one direction only. More specifically, each one-way electronic device 8 imposes one-way electric current flow into a positive terminal of cell 3 and out from a negative terminal of cell 3 (i.e. the electric current through cell 3 and generated in secondary equalizing circuit 7 simply charges cell 3). Finally, each secondary equalizing circuit 7 is connected to a drive device 9, which can be activated to zero the voltage applied to cell 3 by secondary equalizing circuit 7, i.e. to prevent current generated in secondary equalizing circuit 7 from circulating through cell 3.

Each secondary equalizing circuit 7 comprises a magnetic ring 10 of ferromagnetic material, which forms the magnetic core of transformer 5 and is coupled magnetically to both secondary equalizing circuit 7 and main equalizing circuit 4. Each secondary equalizing circuit 7 comprises a single turn coupled magnetically to corresponding magnetic ring 10; and main equalizing circuit 4 comprises a single turn coupled magnetically to all the magnetic rings 10. In other words, as shown clearly in FIG. 1, main equalizing circuit 4 extends through the centre of all the magnetic rings 10, with no further turns about magnetic rings 10; and each secondary equalizing circuit 7 extends through the centre of corresponding magnetic ring 10, with no further turns about magnetic ring 10. In an alternative embodiment not shown, main equalizing circuit 4 and/or secondary equalizing circuits 7 each comprise a number of turns about magnetic rings 10.

Each transformer 5 obviously has a transformation ratio of 1.0, i.e. the alternating current through main equalizing circuit 4 has the same intensity as the alternating current through each secondary equalizing circuit 7. In typical automotive applications, alternating-current generator 6 generates electric current of a few (e.g. 5) amperes, and a frequency of 100 to 300 kHz.

In the FIG. 1 embodiment, each drive device 9 comprises a control switch 11, which is activated to short-circuit the corresponding secondary equalizing circuit 7 upstream from one-way electronic device 8. Each control switch 11 may be electromechanical (e.g. a relay) or fully electronic (e.g. a single MOSFET transistor or a more complex electronic circuit comprising at least one MOSFET transistor). When control switch 11 is deactivated (open), the corresponding secondary equalizing circuit 7 is not short-circuited, and so feeds electric current through cell 3 to recharge (i.e. supply energy to) it. That is, the alternating electric current induced in secondary equalizing circuit 7 by main equalizing circuit 4 coupled magnetically by transformer 5 must flow through cell 3 (obviously, only when flowing in the direction permitted by one-way electronic device 8) which is thus recharged. Conversely, when control switch 11 is activated (closed), the corresponding secondary equalizing circuit 7 is short-circuited and so feeds no electric current through cell 3. That is, the alternating electric current induced in secondary equalizing circuit 7 by main equalizing circuit 4 coupled magnetically by transformer 5 flows through control switch 11 and has no effect on cell 3.

It is important to note that, when activated (closed), control switch 11 has a voltage drop of a few tens of millivolts (e.g. 0.05 volts) at its terminals. So, assuming current generator 6 generates an electric current of 5 amperes, the power loss in an activated (closed) control switch 11 is only a few tens of milliwatts (e.g. 0.025 watts with a voltage drop of 0.05 volts and 5 ampere current). Not being a source of significant energy losses, control switches 11 therefore need not be designed to dispose of much heat, and have no significant negative effect on the efficiency of management unit 1.

In the alternative embodiment shown in FIGS. 2 and 3, each drive device 9 comprises a control circuit coupled magnetically to magnetic ring 10 of corresponding secondary equalizing circuit 7, and having control switch 11, which is activated to short-circuit control circuit 12. The FIGS. 2 and 3 embodiment of drive device 9 operates in the same way as the FIG. 1 embodiment, the only difference being that, in the FIG. 1 embodiment of drive device 9, control switch 11 short-circuits secondary equalizing circuit 7 directly (by being connected directly to secondary equalizing circuit 7), whereas, in the FIGS. 2 and 3 embodiment of drive device 9, control switch 11 short-circuits secondary equalizing circuit 7 indirectly (by being connected to control circuit 12 coupled magnetically to magnetic ring 10 of secondary equalizing circuit 7).

In other words, when control switch 11 is deactivated (open), the corresponding secondary equalizing circuit 7 is not short-circuited, and so feeds electric current through cell 3 to recharge (i.e. supply energy to) it. That is, the alternating electric current induced by main equalizing circuit 4 coupled magnetically by transformer 5 can only flow through corresponding secondary equalizing circuit 7 and hence through cell 3 to recharge (i.e. supply energy to) cell 3. Conversely, when control switch 11 is activated (closed), the corresponding secondary equalizing circuit 7 is short-circuited and so feeds no electric current through cell 3. That is, the alternating electric current induced in secondary equalizing circuit 7 by main equalizing circuit 4 coupled magnetically by transformer 5 flows through control circuit 12 and has no effect on cell 3.

In the FIGS. 1 and 2 embodiments, each one-way electronic device 8 is defined by a rectifying bridge 13 (e.g. a Wheatstone bridge comprising four four-arm-connected diodes). In the FIG. 3 embodiment, each one-way electronic device 8 is defined by one diode 14. Compared with the FIGS. 1 and 2 embodiment, the FIG. 3 embodiment of one-way electronic device 8 has the disadvantage of only being able to supply cell 3 with half the alternating current induced in secondary equalizing circuit 7 (i.e. only the 'positive' half-wave and not the 'negative' half-wave), but has the advantage of being simpler in design (only one diode as opposed to four) and of involving only half the power loss (current only has to flow through one diode as opposed to two series-connected diodes).

For each cell 3 of battery 2, management unit 1 comprises at least one sensor 15 connected to cell 3 to determine its charge status. In the preferred embodiment shown in the drawings, each sensor 15 is a voltmeter, is connected parallel to respective cell 3, and measures the voltage at the terminals of cell 3. Using an equation obtainable experimentally and the voltage at the terminals of cell 3, it is possible to accurately determine the charge of cell 3. In a variation, a temperature sensor also determines the temperature of cell 3, which is used together with the voltage measurement at the terminals of cell 3 to determine the charge of cell 3.

Management unit 1 also comprises a control device 16, which controls alternating-current generator 6 and drive devices 9 to equalize the capacities of cells 3 of battery 2 by transferring energy from the better-performing to lesser-performing cells 3 as the battery discharges, and transferring energy to the better-performing cells 3 as the battery charges.

To transfer energy to a given cell 3, alternating electric current must flow through main equalizing circuit 4, and the corresponding drive device 9 must be deactivated (as stated, when drive device 9 is activated, no energy can be transferred to corresponding cell 3).

In actual use, control device 16 determines the charge status of each cell 3 by means of respective sensor 15 connected to cell 3. The charge status of cell 3 is typically expressed as the amount of charge stored in cell 3, which may be either absolute (i.e. measured, for example, in ampere-hours) or relative (e.g. expressed as a percentage of maximum or rated charge). By comparing the charge status of cells 3, control device 16 determines which cells 3 have a non-deficit-charge status (i.e. not much below average), and which have a deficit-charge status (i.e. well below average). For example, given an average charge status (calculated as the arithmetic, possibly weighted, mean of the charge status of all of cells 3), any cells 3 with a charge status not below 90 percent of average are considered non-deficit-charge status cells, and any cells 3 with a charge status below 90 percent of average are considered deficit-charge status cells.

In actual use, control device 16 activates respective drive device 9 to prevent energy transfer from main equalizing circuit 4 to each secondary equalizing circuit 7 connected to a non-deficit-charge status cell 3, and deactivates respective drive device 9 to transfer energy from main equalizing circuit 4 to each secondary equalizing circuit 7 connected to a deficit-charge status cell 3. By so doing, energy is transferred from the better-performing cells 3 (with a non-deficit-charge status) to the lesser-performing cells 3 (with a deficit-charge status). In this connection, it is important to note that, alternating-current generator 6 being powered by battery 2 (i.e. by all the series-connected cells 3), the electric energy supplied by main equalizing circuit 4 comes from cells 3.

It is important to note that the electric power transferable to cell 3 by respective secondary equalizing circuit 7 is directly proportional to the intensity of the alternating current in main equalizing circuit 4. So, by adjusting the intensity of the alternating current in main equalizing circuit 4 (i.e. adjusting alternating-current generator 6), it is possible to adjust the effectiveness of secondary equalizing circuits 7. Increasing the intensity of the alternating current in main equalizing circuit 4 increases the electric power transferable to cell 3 by respective secondary equalizing circuit 7, but also increases power losses in management unit 1. In one embodiment, the intensity of the alternating current in main equalizing circuit 4 can be adjusted as a function of the overall condition of battery 2, so that, in any situation, the intensity of the alternating current in main equalizing circuit 4 represents an ideal compromise between the need to transfer energy rapidly to the lesser-performing cells 3, and the need to maintain low power losses. For example, when cells 3 are all highly charged, so no energy need be transferred between them, the intensity of the alternating current in main equalizing circuit 4 may be zero or at any rate very low; whereas, when cells 3 are poorly charged, so large amounts of energy need be transferred between them, the intensity of the alternating current in main equalizing circuit 4 must be high. The intensity of the alternating current in main equalizing circuit 4 may therefore be inversely proportional to the mean charge status of cells 3 (the higher the mean charge status of cells 3, the lower the intensity of the alternating current in main equalizing circuit 4).

Besides being highly effective and efficient, the electric energy management unit 1 described is also extremely simple, strong and compact. This is due to the extremely simple, compact design of the magnetic circuits of transformers 5 defined by magnetic rings 10, and the fact that equalizing circuits 4 and 7 simply extend through, as opposed to being wound in a number of turns about, magnetic rings 10.

The invention claimed is:

1. A management unit for managing electric energy stored in a battery comprising a number of series-connected cells, the management unit comprising:
    a main equalizing circuit, which forms the primary of an electric transformer and has an electric alternating-current generator; and
    for each cell of the battery, a secondary equalizing circuit, which forms the secondary of the electric transformer and is therefore coupled magnetically to the main equalizing circuit, is connected parallel to the cell, has a one-way electronic device which imposes electric current flow to the cell in one direction only, and is connected to a drive device that can be activated to zero the voltage applied to the cell by the secondary equalizing circuit;
    the management unit being wherein the electric alternating-current generator is a constant alternating-current generator, which is powered by the battery and feeds alternating current of constant intensity through the main equalizing circuit.

2. A management unit as claimed in claim 1, and comprising:
    for each cell of the battery, at least one sensor connected to the cell to determine the charge status of the cell; and
    a control device, which activates the corresponding drive device to prevent energy transfer from the main equalizing circuit to each secondary equalizing circuit connected to a non-deficit-charge status cell, and deactivates the corresponding drive device to transfer energy from the main equalizing circuit to each secondary equalizing circuit connected to a deficit-charge status cell 3.

3. A management unit as claimed in claim 1, wherein each secondary equalizing circuit comprises a magnetic ring, which forms the magnetic core of the electric transformer and is coupled magnetically to both the secondary equalizing circuit and main equalizing circuit.

4. A management unit as claimed in claim 3, wherein:
    each secondary equalizing circuit comprises a single turn coupled magnetically to the corresponding magnetic ring; and
    the main equalizing circuit comprises a single turn coupled magnetically to all the magnetic rings.

5. A management unit as claimed in claim 1, wherein each drive device comprises a control switch, which is activated to short-circuit the corresponding secondary equalizing circuit upstream from the one-way electronic device.

6. A management unit as claimed in claim 1, wherein:
    each secondary equalizing circuit comprises a magnetic ring, which forms the magnetic core of the electric transformer and is coupled magnetically to both the secondary equalizing circuit and main equalizing circuit;
    each drive device comprises a control circuit coupled magnetically to the magnetic ring of the corresponding secondary equalizing circuit, and having a control switch, which is activated to short-circuit the control circuit.

7. A management unit as claimed in claim 1, wherein each one-way electronic device is defined by a diode.

8. A management unit as claimed in claim 1, wherein each one-way electronic device is defined by a rectifying bridge.

9. A management unit as claimed in claim 1, wherein each one-way electronic device imposes electric current flow to the cell in one direction only, which is into a positive terminal of the cell and out of a negative terminal of the cell.

10. A management unit as claimed in claim 1, wherein the control device adjusts the intensity of the alternating current in the main equalizing circuit by adjusting the electric alternating-current generator as a function of the overall condition of the battery.

11. A method of managing electric energy stored in a battery comprising a number of series-connected cells; the method comprising the steps of:
    constructing a main equalizing circuit, which forms the primary of an electric transformer, has a constant alternating-current generator powered by the battery, and which feeds alternating current of constant intensity through the main equalizing circuit;
    constructing, for each cell of the battery, a secondary equalizing circuit, which forms the secondary of the electric transformer and is therefore coupled magnetically to the main equalizing circuit, is connected parallel to the cell, has a one-way electronic device which imposes electric current flow to the cell in one direction only, and is connected to a drive device that can be activated to zero the voltage applied to the cell by the secondary equalizing circuit;

determining the charge status of each cell by means of at least one respective sensor connected to the cell;

activating the corresponding drive device to prevent energy transfer from the main equalizing circuit to each secondary equalizing circuit connected to a cell with a non-deficit-charge status; and deactivating the corresponding drive device to transfer energy from the main equalizing circuit to each secondary equalizing circuit connected to a cell with a deficit-charge status.

* * * * *